United States Patent
Acheson et al.

(10) Patent No.: US 9,372,109 B2
(45) Date of Patent: *Jun. 21, 2016

(54) HARVESTER ELEVATOR IN-FLOW WEIGHT SENSOR AND METHODS FOR THE SAME

(71) Applicant: Raven Industries, Inc., Sioux Falls, SD (US)

(72) Inventors: John Earl Acheson, Sioux Falls, SD (US); Stephen Filip Fjelstad, Worthing, SD (US); Douglas Samuel Prairie, Sioux Falls, SD (US)

(73) Assignee: Raven Industires, Inc., Sioux Falls, SD (US)

( * ) Notice: Subject to any disclaimer, the term of this patent is extended or adjusted under 35 U.S.C. 154(b) by 193 days.

This patent is subject to a terminal disclaimer.

(21) Appl. No.: 13/835,099

(22) Filed: Mar. 15, 2013

(65) Prior Publication Data
US 2014/0262548 A1    Sep. 18, 2014

(51) Int. Cl.
| | |
|---|---|
| G01G 19/08 | (2006.01) |
| G01G 11/00 | (2006.01) |
| G01G 11/04 | (2006.01) |
| G01G 19/12 | (2006.01) |
| G01G 21/23 | (2006.01) |

(52) U.S. Cl.
CPC .............. *G01G 11/003* (2013.01); *G01G 11/04* (2013.01); *G01G 19/12* (2013.01); *G01G 21/23* (2013.01)

(58) Field of Classification Search
CPC ................. G01G 11/00–11/046; G01G 19/12; G01G 21/23; G01F 13/003; A01F 12/46; A01D 41/1271
See application file for complete search history.

(56) References Cited

U.S. PATENT DOCUMENTS

| | | | |
|---|---|---|---|
| 4,376,298 A | 3/1983 | Sokol et al. | |
| 5,092,819 A | 3/1992 | Schroeder et al. | |
| 5,106,339 A | 4/1992 | Braun et al. | |
| 5,343,761 A * | 9/1994 | Myers | 73/861.73 |
| 5,351,558 A | 10/1994 | Horn et al. | |
| 5,561,250 A | 10/1996 | Myers | |
| 5,611,420 A * | 3/1997 | Heim et al. | 198/371.2 |

(Continued)

FOREIGN PATENT DOCUMENTS

| | | |
|---|---|---|
| DE | 112014001474 T5 | 11/2015 |
| EP | 0960557 A1 | 12/1999 |

(Continued)

OTHER PUBLICATIONS

"International Application Serial No. PCT/US2014/020253, International Search Report mailed May 21, 2014", 2 pgs.

(Continued)

*Primary Examiner* — Peter Macchiarolo
*Assistant Examiner* — Natalie Huls
(74) *Attorney, Agent, or Firm* — Schwegman Lundberg & Woessner, P.A.

(57) ABSTRACT

A system for measuring crop weight in a harvester elevator includes a receiver and processing node and one or more weight sensing instruments coupled to one or more paddles of the harvested elevator, respectively. The weight sensing instruments each include a weight sensor and a transmitter in communication with a receiver and processing node. The weight sensor is configured to dynamically measure the weight of a static harvested crop, relative to the sensor and corresponding paddle, as it ascends in the harvester elevator.

27 Claims, 5 Drawing Sheets

(56) References Cited

U.S. PATENT DOCUMENTS

| | | | |
|---|---|---|---|
| 5,685,772 A * | 11/1997 | Andersen et al. | 460/6 |
| 5,686,671 A * | 11/1997 | Nelson et al. | 73/861.73 |
| 5,700,961 A | 12/1997 | Anthony et al. | |
| 5,750,877 A * | 5/1998 | Behnke et al. | 73/1.33 |
| 5,863,247 A * | 1/1999 | Behnke et al. | 460/6 |
| 5,957,773 A | 9/1999 | Olmsted et al. | |
| 5,959,257 A | 9/1999 | Campbell et al. | |
| 6,073,427 A | 6/2000 | Nichols | |
| 6,121,782 A * | 9/2000 | Adams et al. | 324/689 |
| 6,138,518 A * | 10/2000 | Strubbe | 73/861.73 |
| 6,192,664 B1 * | 2/2001 | Missotten et al. | 56/10.2 R |
| 6,244,782 B1 * | 6/2001 | Bitelli | 404/84.1 |
| 6,272,935 B1 * | 8/2001 | Strubbe | 73/861.73 |
| 6,282,967 B1 * | 9/2001 | Homburg et al. | 73/861 |
| 6,283,853 B1 * | 9/2001 | Pellenc et al. | 460/6 |
| 6,285,198 B1 * | 9/2001 | Nelson et al. | 324/664 |
| 6,313,414 B1 | 11/2001 | Campbell | |
| 6,327,899 B1 | 12/2001 | Diekhans et al. | |
| 6,460,008 B1 | 10/2002 | Hardt | |
| 6,508,049 B1 * | 1/2003 | Cox et al. | 56/10.2 R |
| 6,525,276 B1 * | 2/2003 | Vellidus et al. | 177/136 |
| 6,584,424 B2 | 6/2003 | Hardt | |
| 6,616,527 B2 | 9/2003 | Shinners et al. | |
| 6,669,557 B2 | 12/2003 | Adams et al. | |
| 6,899,616 B1 * | 5/2005 | Murray et al. | 460/6 |
| 6,951,514 B1 * | 10/2005 | Coers et al. | 460/1 |
| 7,340,996 B1 | 3/2008 | Viaud | |
| 7,412,905 B1 | 8/2008 | Bishel | |
| 7,500,280 B2 | 3/2009 | Dixon et al. | |
| 2002/0133309 A1 * | 9/2002 | Hardt | 702/129 |
| 2003/0033862 A1 | 2/2003 | Mcelhaney et al. | |
| 2005/0225334 A1 | 10/2005 | Rains et al. | |
| 2007/0050116 A1 | 3/2007 | Jernigan | |
| 2009/0007709 A1 | 1/2009 | Sugita et al. | |
| 2011/0209925 A1 * | 9/2011 | Rossi | 177/145 |
| 2012/0004815 A1 | 1/2012 | Behnke | |
| 2012/0253760 A1 | 10/2012 | Zielke | |
| 2013/0000393 A1 | 1/2013 | Cash et al. | |
| 2013/0317696 A1 * | 11/2013 | Koch et al. | 701/33.1 |
| 2014/0174199 A1 * | 6/2014 | Strnad et al. | 73/861.73 |
| 2014/0216894 A1 * | 8/2014 | Fourney | 198/340 |
| 2014/0236381 A1 | 8/2014 | Anderson et al. | |
| 2014/0262547 A1 * | 9/2014 | Acheson et al. | 177/1 |
| 2014/0266253 A1 | 9/2014 | Acheson et al. | |

FOREIGN PATENT DOCUMENTS

| | | |
|---|---|---|
| EP | 0960558 B1 | 4/2003 |
| WO | WO-2013023142 A1 | 2/2013 |
| WO | WO-2014143759 A1 | 9/2014 |
| WO | WO-2014149675 A1 | 9/2014 |
| WO | WO-2014151025 A2 | 9/2014 |
| WO | WO-2014151025 A3 | 9/2014 |

OTHER PUBLICATIONS

"International Application Serial No. PCT/US2014/020253, Written Opinion mailed May 21, 2014", 7 pgs.

"International Application Serial No. PCT/US2014/024789, International Search Report mailed Jul. 14, 2014", 2 pgs.

"International Application Serial No. PCT/US2014/024789, Written Opinion mailed Jul. 14, 2014", 4 pgs.

"International Application Serial No. PCT/US2014/027861, International Search Report mailed Jul. 21, 2014", 3 pgs.

"International Application Serial No. PCT/US2014/027861, Written Opinion mailed Jul. 21, 2014", 3 pgs.

"Ag Leader Yield Monitoring", [online]. Retrieved from the Internet: <URL: http://www.agleader.com/products/yield-monitoring/>, (Published Prior to Mar. 15, 2013), 13 pgs.

"Precision Planting YieldSense", [online]. Retrieved from the Internet: <URL: http://www.precisionplanting.com/#products/yieldsense/>, (Published Prior to Mar. 15, 2013), 6 pgs.

"Raven SmartYield Pro", [online]. Retrieved from the Internet: <URL: http://ravenprecision.com/products/harvest-controls/smartyield-pro/>, (Published Prior to Mar. 15, 2013), 3 pgs.

"Trimble Yield Monitoring", [online]. Retrieved from the Internet: <URL: http://www.trimble.com/Agriculture/yield-monitoring.aspx>, (Published Prior to Mar. 15, 2013), 4 pgs.

"International Application Serial No. PCT/US2014/020253, Written Opinion mailed Mar. 6, 2015", 13 pgs.

"Weights, Measures, and Conversion Factors for Agricultural Commodities and Their Products", United States Department of Agriculture, Economic Research Service, Agricultural Handbook No. 697, Supersedes SB-616, Conversion Factors and Weights and Measures for Agricultural Commodities and Their Products, 1979, 77.

Beuerlein, Jim, "Bushels, Test Weights and Calculations", The Ohio State University FactSheet, Department of Horticulture and Crop Science, 2021 Coffey Road, Columbus, Ohio 43210-1044, ohioline.ag.ohio-state.edu—your Link to Information, News, and Education; http://ohioline.osu.edu/agf-fact/0503.html, (Jul. 2, 2015), 2.

International Application Serial No. PCT/US2014/020253, International Preliminary Report on Patentability mailed Aug. 7, 2015, 13 pgs.

Application Serial No. PCT/US2014/024789, International Preliminary Report on Patentability mailed Oct. 29, 2015, 6 pgs.

* cited by examiner

FIG. 7

HARVESTER ELEVATOR IN-FLOW WEIGHT SENSOR AND METHODS FOR THE SAME

CROSS-REFERENCE TO RELATED PATENT DOCUMENTS

This patent application is also related to US patent application entitled "MULTI-VARIABLE YIELD MONITOR AND METHODS FOR THE SAME"; filed on an even date herewith, and incorporated herein by reference.

This patent application is also related to US patent application entitled "REMOTE MOISTURE SENSOR AND METHODS FOR THE SAME"; filed on an even date herewith, and incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc.; Sioux Falls, S. Dak. All Rights Reserved.

TECHNICAL FIELD

This document pertains generally, but not by way of limitation, to systems and methods of determining crop weight.

BACKGROUND

Yield monitor systems are used to measure crop yields during harvesting. Yield characteristics, such as weight or moisture content, are used to assess the quality and quantity of a crop and accordingly determine its purchase price. In one example, a yield equation is used that assesses the quality and quantity of a crop is based on four distinct variables and a fifth related variable. The four variables include volume, temperature, moisture, and test weight (density) of the harvested crop. The fifth related variable is the weight of the harvested crop, and with at least some yield monitors the weight is determined according to the volume and an assumed test weight.

There are a number of mechanisms to measure crop weight. In one example, an impact plate is used to measure an impact force of harvested crop thrown against the impact plate when exiting a crop chute of a harvester elevator. The measured impact force is conditioned and converted into a harvested crop weight.

OVERVIEW

The present inventors have recognized, among other things, that a problem to be solved can include the minimizing of error introduced by current crop weight measuring techniques (e.g., impact based measurements) while still allowing for in-flow weight measurements. In an example, the present subject matter can provide a solution to this problem, such as by a system or method that measures a crop weight while the crop is static relative to a weight sensor, but otherwise remaining inflow through the harvester. Stated another way, the crop and weight sensor are stationary relative to one another (even while both of the crop and the weight sensor are moving within an elevator), consequently error introduced by movement of the crop relative to the weight sensor (e.g., from impact as in other sensors) is avoided.

In one example, the systems or methods described herein measure a property corresponding to crop weight of the harvested crop, such as pressure on a weight sensor, as it ascends in a harvester elevator of a combine. This dynamic system allows for weight measurement of a harvested crop that is held static relative to a sensor while the crop and the sensor move as a unit within the harvester elevator. By continuously measuring the weight of a crop that is static relative to the weight sensor, the systems and methods described herein substantially reduce error of current systems and methods that continuously measure a harvested crop that is moving relative to the weight sensor.

For example, impact force plates suffer from error caused by less predictable dynamic impact forces and assumptions made about those forces. A portion of the crop thrown at the impact force plate makes contact as predicted, while another portion of the crop unpredictably misses the plate, strikes from a less than optimal angle or interrupts an impact that would otherwise be measured. The present systems or methods solve the problem of inaccurate crop weight measurements due to dynamic weight measurement techniques by measuring the weight of a static quantity of the crop relative to a weight sensor. Further, by reducing the error of each discrete weight measurement (e.g., the weight of a quantity of a harvested crop on a single paddle) the present systems and methods minimize the error introduced into an extrapolated calculation of an overall harvested crop weight.

In another example, the system and methods described herein utilize more than one weight sensor, such that the crop weight of a representative percentage of the harvested crop is determined. Present methods and systems use a weight sensor that measures only a small percentage of the overall harvested crop that impacts or passes over the weight sensor. Accordingly, the present disclosure, including multiple weight sensors associated with a corresponding plurality of harvester elevator paddles, substantially reduces the error of current systems and methods by increasing the accuracy of each measurement event of the harvested crop.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
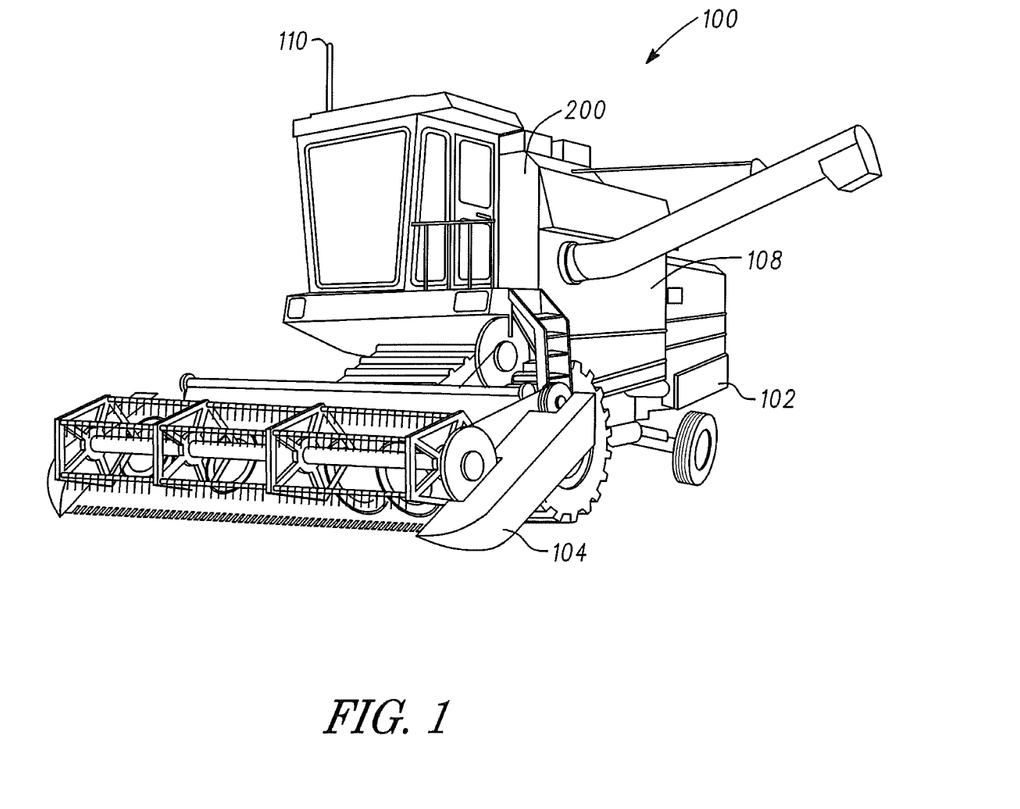
FIG. 1 is perspective view of one example of a harvester.

FIG. 1 shows one example of a harvester, such as a harvester combine 100. As shown, the harvester 100 includes a body 102 and a header 104 movably coupled with the body 102. In one example, the header 104 is used to cut and divide crops and deliver the crops into the body 102 for further processing. Referring again to FIG. 1, in one example, the harvester 100 includes a harvester elevator 200 configured to remove processed crop, for instance from the internal mechanisms of the harvester 100, and deposit the crop within a crop tank 108. As further shown in FIG. 1, an antenna such as a GPS antenna 110 is further provided on the body 102 to provide accurate position data of the harvester 100, for instance while harvesting within a field.

As previously described, the harvester 100 includes a harvester elevator 200 configured to deliver crop from processing into a crop tank 108. For instance, harvester elevator 200 includes, but is not be limited to, a combine elevator, fruit picking conveyor, nut conveyor, or another system that generates an ongoing flow of a crop. As described herein, the harvester elevator 200 includes one or more sensing instruments, as well as a receiver and processing node configured to measure a crop weight of a crop delivered through the harvest elevator 200 to the crop tank 108. Further, the crop weight measuring system provided herein is configured to measure the crop weight of harvested crop from a field. The crop weight measurement system is configured to determine the crop weight in a dynamic fashion, such as when as the harvester 100 is harvesting the crop within a field.

Figure 2:
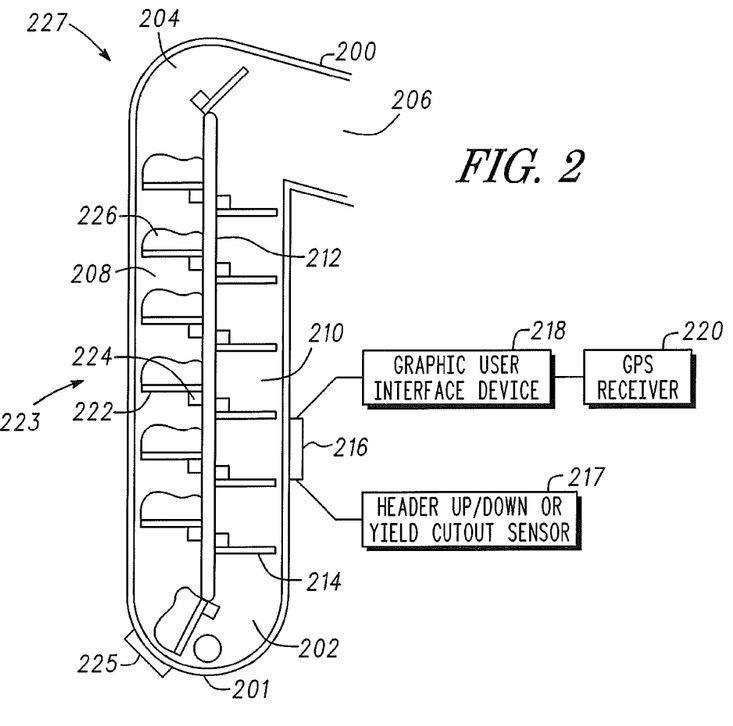
FIG. 2 is a schematic diagram of a crop weight sensor system.

Referring now to FIG. 2, one example of a harvester elevator 200 is provided. In the schematic view provided in FIG. 2, an elevator loop 212 is shown extending through the harvester elevator 200. The elevator loop 212 includes a plurality of paddles 214 typically arranged in an offset fashion that accordingly move within ascending and descending segments 208, 210. During the descending segment 210 the paddles 214 move without a harvested crop and accordingly engage with a harvested crop for instance at a trough segment 202. The harvested crop is in one example supplied through a supply auger 201 and is engaged by one or more of the paddles 214 as the paddles move through the trough segment 208. The harvested crop, for instance, is a quantity of harvested crop 226, as shown in FIG. 2, which is elevated along the ascending segment 208 of the harvester elevator 200. In one example, the quantity of harvested crop 226 on each of the paddles 214 is substantially static relative to the paddle 214 as it ascends. That is to say, the paddle 214 and the quantity of harvested crop 226 on the respective paddle 214 are substantially static relative to one another while the composites of the quantity of the harvested crop 226 and the paddle 214 are otherwise moving within the ascending segment 208 towards an apex segment 204. The quantity of harvested crop 226 is elevated to the apex segment 204, as previously described, and delivered through a crop chute 206, for instance to the crop tank 108.

As further shown in FIG. 2, one example of a crop weight measuring system 227 is provided. In the example shown, the crop weight measuring system 227 includes sensing instruments 223, 225 configured to determine one or more harvested crop characteristics dynamically, for instance as the harvester 100 is harvesting the crop within a field. In the example shown, the crop weight measuring system 227 includes a weight sensing instrument 223 and a moisture and temperature sensing instrument 225. In the example shown in FIG. 2, the weight sensing instrument 223 includes a weight sensor 224 and microcontroller 222 associated with one or more of the paddles 214. Stated another way, the weight sensing instrument 223 is installed on one of the paddles 214 (or alternatively on all or a plurality of paddles 214 of the elevator loop 212). The harvester elevator 200 includes, for instance, a plurality of weight sensing instruments 223 distributed of the plurality of paddles 214. The moisture and temperature sensing instrument 225 is positioned for instance within a portion of the trough segment 202. The moisture and temperature instrument 225 is configured to measure the moisture content as well as the temperature of the harvested crop as it enters the harvester elevator 200, for instance immediately before and during engagement and lifting by one or more of the paddles 214.

In still another example, the crop weight measuring system 227 includes a header orientation instrument 217. In one example, the header orientation instrument 217 is coupled with the header, such as the header 104 shown in FIG. 1. The header orientation instrument 217 is sized and shaped to determine the orientation of the header 104, for instance while the header is in a down position and accordingly harvesting the crop in the field and in an up position where the header 104 is disengaged and accordingly no longer harvesting the crop. As described herein, in one example the header orientation instrument 217 is associated with the antenna 110 to accordingly index the location of the harvester 100 and the corresponding position of the header 104 (whether up or down) with that corresponding position.

As further shown in FIG. 2, the crop weight measuring system 227 includes a receiver and processing node 216. The receiver and processing node 216, in one example, serves as the nexus point or communal node for each of the sensing instruments including, for instance, the one or more weight sensing instruments 223, including each weight sensor 224 and microcontroller 222, and the moisture and temperature instrument 225. As further shown in FIG. 2, in one example the receiver and processing node 216 is in communication with the antenna such as the antenna 110 previously shown in FIG. 1. Accordingly, any of the crop characteristics measured with one or more of the weight sensing instrument 223 and the moisture and temperature instrument 225 are associated with the position of the harvester 100, as described herein. Additionally, the cooperation between the antenna 110, the receiver and processing node 216 and one or more of the instruments described herein are used to accordingly determine the harvested crop weight, such as a dry harvested crop weight, and associate those crop characteristics with a particular location within a field. Stated another way, the crop weight measuring system 227 is able to dynamically measure the harvested crop weight with the instruments previously described herein and associate the harvested crop weight, or dry harvested crop weight, with the corresponding location on a map, for instance a yield map including a plurality of zones. By blending this information, for instance with the receiver and processing node 218, a dynamic map of the dry harvested crop weight within the field can be produced.

In another example, the crop weight measuring system 227 includes a graphical user interface (GUI) 218 configured to allow user input from an operator. For instance the operator is able to initiate one or more of calibration, diagnostics, and review the sensor inputs and yield outputs communicated to and delivered from the receiver and processing node 216 for instance while the harvester 100 is in a harvesting operation within a field.

The weight sensing instrument 223 and moisture and temperature sensing instrument 225 are typically configured to dynamically measure a quantity of harvested crop delivered through the harvester elevator 200 in a particular time. Accordingly the instruments 223, 225 are able to dynamically measure the various harvested crop characteristics as those characteristics change for instance as the harvester 100 moves through different areas of the field having a frame production (e.g., yield) of a particular harvested crop. That is to say, the instruments including, for instance, the weight sensing instrument 223 and the moisture and temperature instrument 225 are able to dynamically measure crop characteristics as a particular quantity of crop is moving through the harvester elevator 106. Accordingly, as crop characteristics change throughout the field the instruments 223, 225 in cooperation with receiver and processing node 216 are able to measure and log the corresponding crop characteristics.

Figure 3:
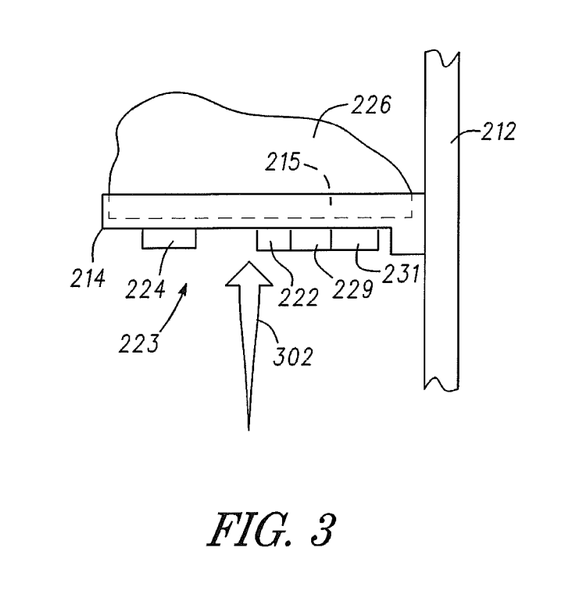
FIG. 3 is a schematic diagram of a paddle mounted weight sensor.

Referring now to FIG. 3 one example of the weight sensing instrument 223 is provided. As previously shown in FIG. 2, the weight sensing instrument 223, including the weight sensor 224 and microcontroller 222, is installed with one or more of the paddles 214 moving in the ascending segment 208, such as in the direction 302. In other embodiments, the system 227 can include a weight sensing instrument 223 on fewer than each of the paddles 214. For example, every other paddle 214 can include an instrument 223 or only one paddle 214 may include a sensing instrument 223.

One example of such a paddle 214, within harvested crop 226, is provided in FIG. 3. For instance, the harvested crop 226 can rest on a surface of the paddle 214 or can rest within a cavity 215 configured to hold or support the harvested crop 226 as the paddle 214 ascends 302 in the ascending segment 208. As shown, the weight sensing instrument 223 includes a weight sensor 224 positioned within or adjacent to the paddle 214. The weight sensor 224 includes, but is not limited to, one or more types of weight sensors such as load cells, strain gauges, piezo elements positioned below a movable plate, and the like. In an example, the weight sensor 224 includes a torque sensor configured to measure the torque generated by the harvested crop 226 on a point of attachment between the paddle 214 and the elevator loop 212. As further shown in FIG. 3, the weight sensing instrument 223, in another example, includes a microcontroller 222 in communication with the weight sensor 224. The microcontroller 222 is powered in one example by a power source 229 for instance including a battery capacitor charged for instance by the movement of the paddle 214 within the harvester elevator 200 and the like. As further shown in FIG. 3, the microcontroller 222 is in one example coupled with a transmitter 231, such as a radio or wireless transmitter. The transmitter 231 facilitates communication between the weight sensing instrument 223 and the receiver and processing node 216. Accordingly, the moving weight sensing instrument 223 is able to deliver the measured weight of a quantity of the harvested crop 226 to the receiver and processing node 216 even while ascending through the ascending segment 208.

The weight sensing instrument 223 shown in FIG. 3 is able to determine a static weight of the quantity of harvested crop 226. For instance, as the paddle 214 ascends through the ascending segment 208, the quantity of harvested crop 226 is static relative to the paddle 214. Accordingly, any weight determinations made with the weight sensing instrument 223 are not subject to dynamic loading of the quantity of harvested crop 226 (for instance as is the case with the harvested crop impacting an impact plate). Instead, the quantity of the harvested crop 226 is statically positioned on the paddle 214 and accordingly the weight sensor 224 is able, for instance within the ascending segment 208, to conduct one or more weight measurements and thereby accurately determine the weight of the quantity of harvested crop 226 and deliver the weight to the receiver and processing node 216.

Figure 4:
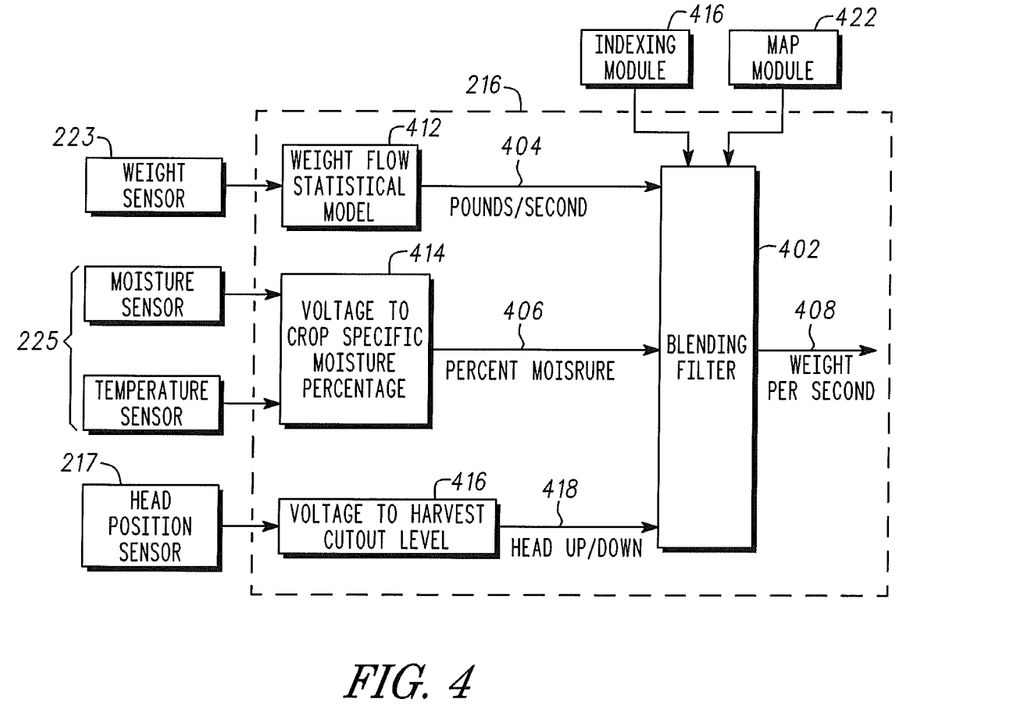
FIG. 4 is a block diagram showing one example of a receiving and processing node.

FIG. 4 shows one example of the receiver and processing node 216 previously shown in FIG. 2. As shown, a plurality of inputs are provided to the receiver and processing node 216 including one or more inputs from the sensing instruments previously described herein. In FIG. 4 the sensing instruments, such as the weight sensing instrument 223 and the moisture and temperature instrument 225 are shown in communication with the receiver and processing node 216. As described herein, the plurality of inputs from the sensing instruments are used by the receiver and processing node 216 to accordingly determine the dry harvest crop weight 408. As further shown in FIG. 4, the harvested crop characteristics 404, 406 are input to a filter, such as the blending filter 402 providing one or more numerical calculation, model, and the like configured to use the inputted harvested crop characteristics 404, 406 to accordingly determine the dry harvested crop weight 408. In another example the receiver and processing node 216 further includes an indexing module 410 and a map module 422. As will be described herein, the indexing module 410 is in communication with an antenna, such as the antenna 110 previously described herein. Accordingly, one or more of the inputted crop characteristics 404, 406 in the dry harvested crop weight 408 may be associated with the location of the harvester 100 to accordingly provide index locations for each of the determined crop characteristics 404, 406 and dry harvested crop weight 480 as they are determined from the inflow of crops, for instance from the harvester elevator 200 as described herein. In another example, the map module 422 includes these indexed crop characteristics 404, 406 and dry harvested crop weight 408 and plots these characteristics on a map to accordingly generate a map including the crop characteristics 404, 406 and the dry harvested crop weight 408 plotted thereon.

As previously described, the receiver and processing node 216 is in communication with the instruments previously described and shown in FIGS. 2 and 3. For instance, the weight sensing instrument 223 is input to the receiver and processing node 216, for instance into a weight flow module 412. The weight flow module 412 includes a statistical model generated according to empirical analysis of, for instance, the harvester elevator 200, the paddles 214 and other characteristics, such as characteristics of the harvested crop 404, 406 to accordingly use the signal provided by the weight sensing instrument 223 to accordingly generate harvested crop characteristics corresponding to a basic weight per second 404 that is then input to the blending filter 402 for determining the dry harvested crop weight 408.

In another example, the receiver and processing node 216 is in communication with other instruments of the crop weight measuring system 227, such as the moisture and temperature sensor 225, shown in FIG. 2. For instance, the receiver and processing node 216 is in communication with a moisture and temperature instrument 225 and optionally a head position instrument 217. In the example, the moisture and temperature instrument 225 is in communication with a moisture content module 414. The moisture content module 414 is configured to interpret data provided by the moisture and temperature sensing instrument 225 and accordingly determine a harvested crop moisture content 406 as one of the inputted harvested crop characteristics. In another example, the header position instrument 217 is in communication with a header module 416 of the receiver and processing node 216. The header module 416 interprets the signal from the header position instrument 217 and accordingly provides an up/down input 418 to the blending filter 402, for instance a characteristic of the inputted harvested crop characteristics corresponding to an indication of the header 104 shown in FIG. 1 being in an up position or a down position.

Accordingly as shown in FIG. 4, each of the sensing instruments 223, 225, 217 generates one or more corresponding inputted harvested crop characteristics that are then input to the blending filter 402 for instance to generate a dry harvested crop weight 408. Optionally each of the inputted harvested crop characteristics 404, 406 as they are determined, for instance, as the harvester 100 moves through a field and accordingly generates a plurality of each of the crop characteristics, for instance associated with each of the zones, is indexed with the indexing module 410 to the zone corresponding to the particular crop characteristic at a particular time.

Figure 5:
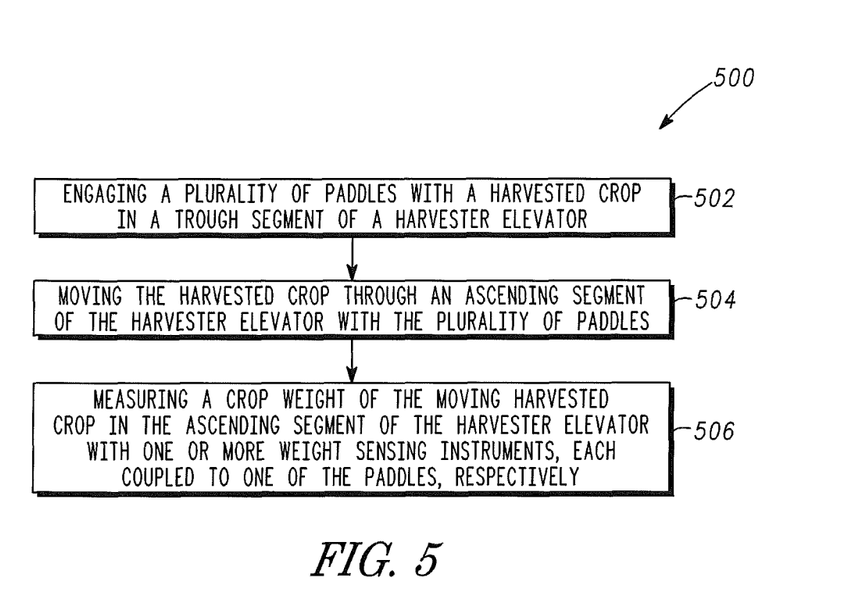
FIG. 5 is a block diagram showing one example of a method for determining the weight of a crop.

Referring again to FIG. 4, harvested crop characteristics 404, 406, 418 are generated on an ongoing basis, for instance as the harvester 100 moves through a field, the blending filter 402 receives the harvested crop characteristics 404, 406, 418 as inputs. Harvested crop characteristic 418 is used in location algorithms. Blending filter 402 thereafter blends the harvested crop characteristics 404, 406 by way of one or more yield equations, models and the like to generate the dry harvested crop weight 408 that varies according to changes in the harvested crop characteristics 404, 406. For instance, as shown in FIG. 5 the blending filter 402 is, in one example, configured to generate a dry harvested weight per second. In a similar manner to the harvested crop characteristics 404, 406, the dry harvested crop weight 408 as it is generated is correspondingly configured for indexing for instance by way of the indexing module 410 with a corresponding location of the harvester 100 within the field. Accordingly, the dry harvested crop weight 408, like the harvested crop characteristics 404, 406, is readily associated with the particular area of the field from which the harvested crop that generates the corresponding harvested crop characteristics 404, 406. The dry harvested crop weight 408 is accordingly dynamically determined as the harvester 100 moves through a field. Each of the harvested crop characteristics 404, 406 in one example are fed through the blending filter 402 to accordingly determine the dry harvested crop weight 408. Accordingly, as the harvested crop characteristics 404, 406 change, for instance as the harvested crop moves through the harvester elevator 200, the corresponding dry harvested crop weight 408 changes in a corresponding manner. The crop weight measuring system 227, as shown in FIG. 2, is accordingly able to determine the harvested crop characteristics 404, 406 and the dry harvested crop weight 408 on an instantaneous basis and thereby measures changes in each of the harvested crop characteristics 404, 406 and the related dry harvested crop weight 408 dependent upon the location of the harvester 100 within the field and the character of the harvested crop being harvested for that particular location.

As previously described and further shown in FIG. 4, the map module 422 is further in communication with the blending filter 402. In a similar manner to the association of the harvested crop characteristics 404, 406 with the particular locations with the indexing module 410, the map module 422 communicates with the indexing module 410, for instance by way of the blending filter 402 to associate and generate a map including, for instance, a plurality of zones and the corresponding harvested crop characteristics 404, 406 and the dry harvested crop weight 408 measured and determined for the particular zones. Accordingly, the map module 422 generates a map for a particular field including a plurality of zones therein with the associated harvested crop characteristics 404, 406 and dry harvested crop weight 408 for each of the zones mapped to the various zones on the generated yield map.

FIG. 5 shows a block diagram illustrating one example of a method 400 for measuring a crop weight. In describing the methods 500 and 600 reference is made to features and elements previously described herein, including numbered references. Where convenient, numbered elements provided within the description of the methods 500 and 600 are not intended to be limiting, instead numbered references are provided for convenience and further include any similar features described herein, as well as their equivalents. At 502, the method 500 includes engaging a plurality of paddles with a harvested crop in a trough segment of a harvester elevator. For instance, as previously described herein, the harvester elevator 200 includes the plurality of paddles 214 moving along an elevator loop 212 within the elevator shaft 228 and through the trough segment 202, ascending segment 208, apex segment 204, and descending segment 210. Harvested crop 226 is scooped or pushed upward through the trough segment 202 toward the ascending segment 208, such that the harvest crop 226 is contained on or within a portion of the paddle 214.

At 504, the harvested crop 226 is moved through the ascending segment 208 of the harvesting elevator 200 with the plurality of paddles 214. The elevator loop 212 includes a belt, a chain, or similar mechanisms to move the paddles 214, such as while the harvester 100 (e.g., combine) is in motion, throughout the elevator shaft 228. Moving the harvested crop, for instance, includes moving the harvested crop static to the paddle within the ascending segment. That is, the relative velocity of the harvested crop to the paddle on which the harvested crop is situated is substantially zero. However, the moving crop within the ascending segment has a velocity relative to the trough segment of the harvester elevator.

At 506, the method 400 includes measuring a crop weight of the moving harvested crop in the ascending segment of the harvester elevator with one or more weight sensing instruments, each coupled to one of the paddles, respectively. Measuring, for instance, includes continuously measuring the crop moisture content of the harvested crop with at least one of the one or more moisture sensing instruments coupled to one of the plurality of paddles moving the harvested crop through the ascending segment. For instance, the plurality of paddles are distributed in a configuration that positions at least one of the plurality of paddles and one of the weight sensing instruments within the ascending segment through operation of the harvester elevator. That is, the weight sensing instruments are arranged on the elevator loop such that, at any given time, there is a weight sensing instrument in the ascending segment of the harvester elevator. Continuously measuring the crop weight includes measuring, for instance, during operation of the harvester elevator, when harvested crop is present in the ascending segment. The weight sensor 223 provides a signal to the eight flow module 412, including a statistical model generated according to empirical analysis of, for instance, the harvester elevator 200, the paddles 214 and other characteristics, such as characteristics of the harvested crop 404, 406 to accordingly use the signal provided by the weight sensing instrument 223 to accordingly generate harvested crop characteristics corresponding to a basic weight per second 404.

In an example, the crop weight is measured when a quantity of harvested crop, such as the quantity of harvested crop on a paddle with a weight sensing instrument, is static relative to one of the one or more weight sensing instruments in the ascending segment within the harvester elevator, as described herein. In one or more example, weight sensors include sensors such as load cells, strain gauges, piezo elements positioned below a movable plate, torque sensors, and the like, as described herein.

Several options for the method 500 are provided below. In one example, one or more weight sensor 224 of the one or more weight sensing instruments 223 are powered down when located and moving along the descending segment of the harvester elevator. Such an example can provide energy efficiency, as well as mitigate stray or incorrect crop weight measurements that occur in the descending segment and require further statistical analyzing to rule out as viable weight measurements. Further, the one or more weight sensing instruments are triggered to measure the crop weight of the harvested crop in the ascending segment. For instance, a position sensor, a static moisture sensor, or an ascendance sensor is configured to trigger the weight sensing instrument, as described herein. In one example, the measured crop moisture content is correlated to locations on a field, as described herein.

In an example, the method 500 includes measuring a moisture and temperature of the harvested crop, such as in the trough segment 202 and as the paddles engage and move the harvested crop in the ascending segment 208. Further, the measured moisture and temperature of the harvested crop is inputted to the moisture content module 414 which interprets the data provided and accordingly determines a harvested crop moisture content 406 as one of the inputted harvested crop characteristics to the blending filter 402. The blending filter 402 processes the inputs 404, 406 for determining the dry harvested crop weight 408.

Figure 6:
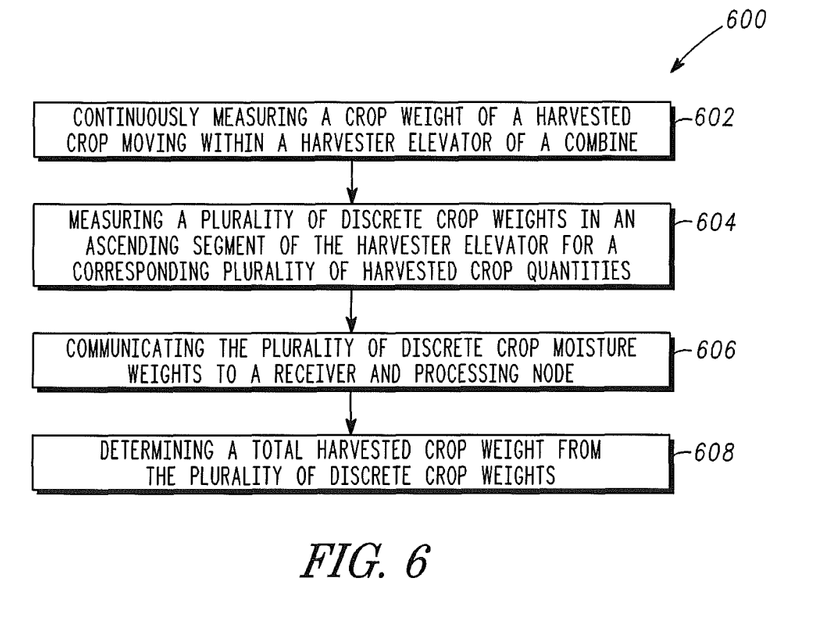
FIG. 6 is a block diagram showing an example of an alternative method for determining the weight of a crop.

FIG. 6 shows a block diagram illustrating one example of a method 600 for measuring a crop weight. At 602, the method 600 includes continuously measuring a crop weight of a harvested crop moving within a harvester elevator of a combine. For instance, continuously measuring includes measuring with at least one weight sensor of one of the plurality of paddles within the ascending segment at any given time during operation of the harvester elevator.

At 604, the method 600 includes measuring a plurality of discrete crop weights in an ascending segment of the harvester elevator for a corresponding plurality of harvested crop quantities. Each of the plurality of the discrete harvested crop quantities, for instance, are static relative to each of a plurality of paddles and instruments coupled with the paddles within the harvester elevator, as described herein. Further, as described herein, each of the plurality of instruments includes a weight sensor configured to measure one of the discrete crop weights of the harvested crop quantities. For instance, measuring the plurality of discrete crop weights includes measuring during at least a portion of travel of the corresponding paddle along the ascending segment. That is, the discrete crop weight can be measured at a bottom, middle, or top portion of the ascending segment, such that the corresponding harvested crop quantity is static relative to the paddle on which the harvested crop quantity is positioned. In an example, continuously measuring includes measuring with at least two weight sensors, and the at least two weight sensors are distributed among the plurality of paddles along the harvester elevator to measure at least one of the plurality of discrete crop weights of the harvested crop quantities ascending along the ascending segment at any given time.

At 606, the method 600 includes communicating (e.g., wirelessly) the plurality of discrete crop weights to a receiver and processing node. In an example, the method includes generating a crop weight log with the plurality of measured discrete crop weights. For instance, each of the plurality of measured discrete crop weights is logged according to time, location on a field, or the like. Further, the method can include generating a harvested crop weight map, including associating the plurality of measured discrete crop weights with corresponding locations of a field. For instance, the plurality of measured discrete crop weights are plotted on a top-down view of the field, such that a weight spectrum of the field is generated. Further, the discrete crop weights, in an example, are grouped by predetermined sections of the field, as described herein.

At 608, the method 600 includes determining a total harvested crop weight, such as a total weight of crop harvested during the operation of the harvester elevator (e.g., net weight) or the weight per unit time (e.g., lbs/min), from the plurality of discrete crop weights. For instance, determining the total harvested crop weight includes monitoring a harvester elevator loop speed of the harvester elevator, wherein the harvester elevator loop speed includes a rate of rotation of the plurality of paddles. Harvester elevator loop speed is variable according to a speed of the combine, such as the elevator loop speed directly reflects a change in speed of the combine. That is, as the combine speeds up the elevator loop speed increases and as the combine slows down the elevator loop speed decreases. In an example, determining the total harvested crop weight includes multiplying the sum of the plurality of discrete crop weights by a ratio of a total number of paddles in the harvester elevator loop to the number of weight sensors. For instance, weight sensing instruments are placed on 25% of the plurality of paddles in the harvester elevator. That is, the ratio of paddles to sensors is 4:1. Such an example is a simple extrapolation technique that does not require a sensor to be on every paddle within the harvester elevator. In an example, an average discrete crop weight per paddle is calculated by averaging the plurality of discrete weights. The average discrete crop weight can be statistically manipulated to determine the total harvested crop weight. For instance, an average harvester elevator loop speed (e.g., loops/minute), the total time the harvester elevator was in operation, the total number of paddles on the elevator loop, and the average discrete crop weight per paddle can be multiplied to provide the total harvested crop weight. The method 600 includes determining a total harvested crop weight, including a dry harvested crop weight, for instance, including blending the percent moisture input 406 with the harvested crop weight 404 to determine the dry harvested crop weight 408.

Figure 7:
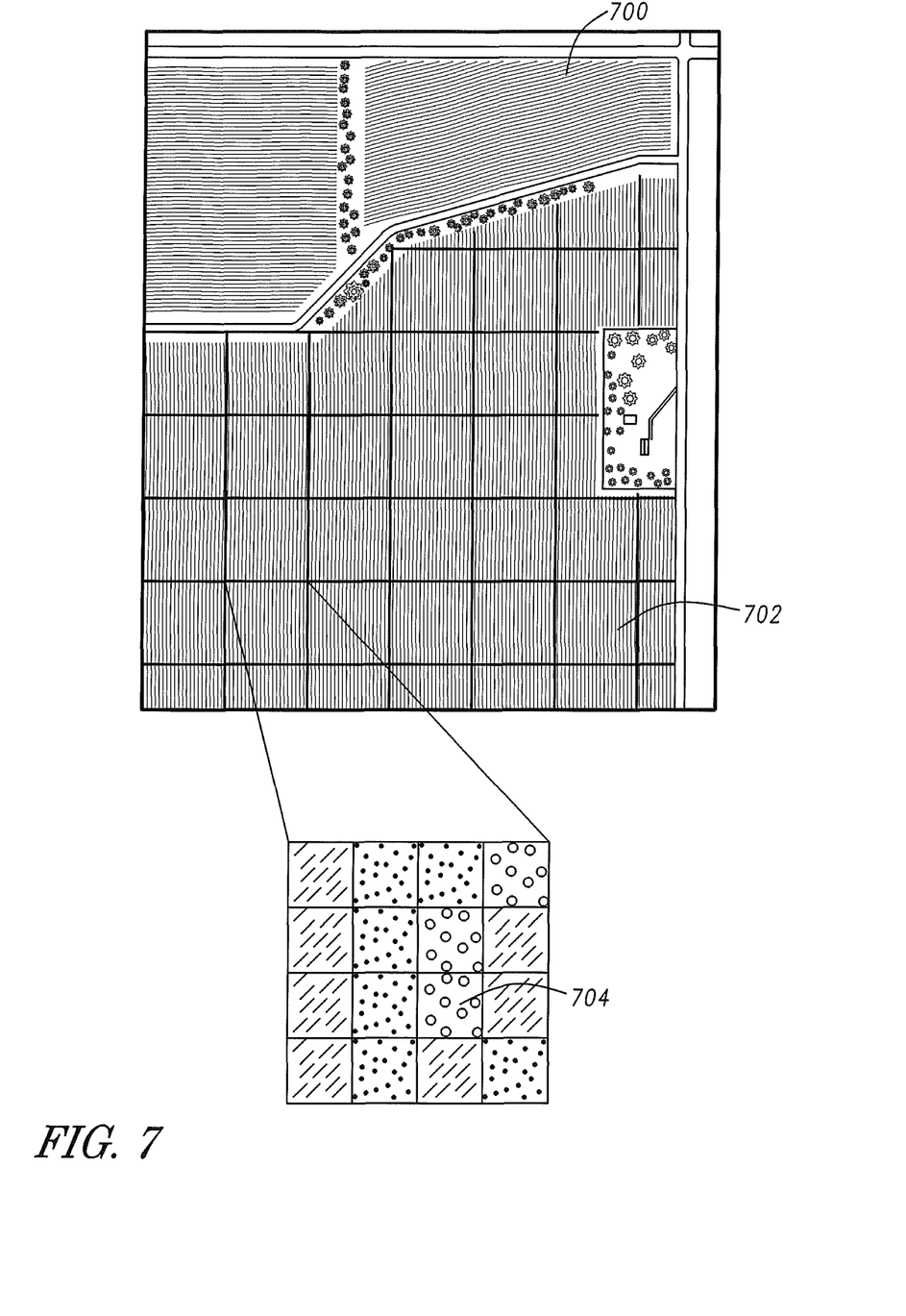
FIG. 7 is one example of a field harvested crop weight map including crop weight values associated with corresponding field locations.

FIG. 7 is a demonstrative example of a yield map 700. Optionally the yield map 700 includes but is not limited to providing a visual representation of the dry harvested crop weight 408 previously shown in FIG. 4. A zoomed in portion of the yield map 700 is shown in the right view of FIG. 7. As shown by way of varying stippling, shading or the like a plurality of zones 702 accordingly have corresponding dry harvested crop weights 408. For instance as shown in FIG. 7 a plurality of zones 702 having varying crop characteristics according to actual measured data for instance provided by the sensing instruments such as the instruments 223 and 225 previously shown in FIGS. 2 and 3 and are associated with the one or more zones 702. The yield map 700 accordingly provides a representation to the operator of the harvested output provided during a harvesting operation. Information provided by the yield map 700 is optionally used for instance to determine better husbandry techniques, planting strategies and the like for the field in the next season.

Referring again to FIG. 7 a sub-zone 704 is provided. As shown each of the sub-zones has different stippling, shading or the like associated with the dry harvested crop weight 408. Optionally the sub-zones 704 (or any of the plurality of zones 702) have varying stippling, shading or coloring techniques or any combination thereof to accordingly provide indications of the dry harvested crop weight 408. As shown in FIG. 7 by way of the stippling, shading, coloring or the like the dry harvested crop weight varies between each of the zones 702. As shown for instance, each of the sub-zones 704 the stippling is different between the zones thereby indicating dry harvested crop weight 408 there between varies. Optionally the yield map 700 provides one or more interactive zones 702. For instance, the user is able to zoom in and examine each of the zones 702 accordingly allowing for instance through a graphical user interface interaction with the field map 700 to accordingly determine the dry harvested crop weight 408 of one or a plurality of the zones 702.

VARIOUS NOTES & EXAMPLES

Example 1 can include subject matter (such as an apparatus, a method, a means for performing acts, or a machine readable medium including instructions that, when performed by the machine, that can cause the machine to perform acts), such as A system for measuring crop weight in a harvester elevator having paddles for moving crop in an ascending segment comprising: a receiver and processing node; one or more weight sensing instruments, each of the one or more weight sensing instruments including: a weight sensor configured for coupling with a portion of the paddle, and a transmitter in communication with the receiver and processing node; and wherein each weight sensing instrument is coupled with a respective one of the paddles of the harvester elevator so that each weight sensing instrument moves with the respective paddle to measure a crop weight of a harvested crop as the harvested crop moves along the ascending segment of a harvester elevator.

Example 2 can include, or can optionally be combined with the subject matter of Example 1 to optionally include comprising a harvester elevator including an elevator loop having a plurality of paddles, and the plurality of paddles are configured to move about the elevator loop in an elevator loop cycle.

Example 3 can include, or can optionally be combined with the subject matter of one or any combination of Examples 1 or 2 to optionally include wherein the one or more weight sensing instruments are distributed among the plurality of paddles of the elevator loop to have at least one weight sensor in the ascending segment at any given time.

Example 4 can include, or can optionally be combined with the subject matter of one or any combination of Examples 1-3 to optionally include comprising at least two weight sensing instruments coupled with at least two respective paddles of the plurality of paddles, and the at least two respective paddles are distributed on the elevator loop to continually measure the crop weight of the harvested crop ascending along the ascending segment.

Example 5 can include, or can optionally be combined with the subject matter of one or any combination of Examples 1-4 to optionally include wherein the one or more weight sensors are configured to measure the crop weigh content of the harvested crop when the a quantity of the harvested crop is static relative to the corresponding weight sensor and ascending within the harvester elevator.

Example 6 can include, or can optionally be combined with the subject matter of one or any combination of Examples 1-5 to optionally include wherein each of the one or more instruments includes a microprocessor configured to perform at least one of filtering and averaging a plurality of weight measurements of the corresponding weight sensor.

Example 7 can include, or can optionally be combined with the subject matter of one or any combination of Examples 1-6 to optionally include wherein the receiver and processing node is configured to determine a rate of the elevator loop cycle.

Example 8 can include, or can optionally be combined with the subject matter of one or any combination of Examples 1-7 to optionally include wherein the one or more instruments are configured to determine a total weight of the harvested crop moved through the harvester elevator.

Example 9 can include, or can optionally be combined with the subject matter of one or any combination of Examples 1-8 to optionally include wherein each of the one or more instruments further comprises: a deactivation trigger configured to power down the weight sensor while the corresponding paddle is moving along a descending segment of the harvester elevator; and an activation trigger configured to power on the weight sensor while the corresponding paddle is moving along the ascending segment of the harvester elevator.

Example 10 can include, or can optionally be combined with the subject matter of one or any combination of Examples 1-9 to optionally include wherein the measurement trigger includes at least one of a position sensor, a static weight sensor, a threshold sensor, and an ascendance sensor.

Example 11 can include, or can optionally be combined with the subject matter of one or any combination of Examples 1-10 to optionally include wherein the measurement trigger includes near field transmitter and receiver.

Example 12 can include, or can optionally be combined with the subject matter of one or any combination of Examples 1-11 to include, subject matter (such as an apparatus, a method, a means for performing acts, or a machine readable medium including instructions that, when performed by the machine, that can cause the machine to perform acts), such as can include a method for measuring a crop weight comprising: engaging a plurality of paddles with a harvested crop in a trough segment of a harvester elevator; moving the harvested crop through an ascending segment of the harvester elevator with the plurality of paddles; and measuring a crop weight of the moving harvested crop in the ascending segment of the harvester elevator with one or more weight sensing instruments, each coupled to one of the paddles, respectively.

Example 13 can include, or can optionally be combined with the subject matter of one or any combination of Examples 1-12 to optionally include wherein measuring the crop weight includes continuously measuring the crop weight of the harvested crop with at least one of the one or more instruments coupled to one of the one or more paddles lifting the harvested crop through the ascending segment.

Example 14 can include, or can optionally be combined with the subject matter of one or any combination of Examples 1-13 to optionally include wherein the one or more paddles are distributed between the plurality of paddles of the harvester elevator in a configuration that positions at least one of the one or more paddles and one of the one or more weight sensing instruments within the ascending segment throughout operation of the of the harvester elevator, and wherein measuring the crop weight includes continuously measuring the crop weight of the harvested crop in the ascending segment.

Example 15 can include, or can optionally be combined with the subject matter of one or any combination of Examples 1-14 to optionally include wherein measuring the crop weight includes measuring the crop weight of a quantity of the harvested crop while the harvested crop is static relative to the weight sensing instrument and ascending within the harvester elevator.

Example 16 can include, or can optionally be combined with the subject matter of one or any combination of Examples 1-15 to optionally include comprising powering down one or more weight sensing instruments when the one or more weight sensing instruments are moving along a descending segment of the harvester elevator.

Example 17 can include, or can optionally be combined with the subject matter of one or any combination of Examples 1-16 to optionally include comprising triggering the one or more weight sensing instruments to measure the crop weight content of the harvested crop in the ascending segment.

Example 18 can include, or can optionally be combined with the subject matter of one or any combination of Examples 1-17 to optionally include comprising corresponding at least a portion of the weight measurements to a location on a field.

Example 19 can include, or can optionally be combined with the subject matter of one or any combination of Examples 1-18 to include, subject matter (such as an apparatus, a method, a means for performing acts, or a machine readable medium including instructions that, when performed by the machine, that can cause the machine to perform acts), such as can include A method for measuring in-flow weight of a harvested crop comprising: continuously measuring a weight of a harvested crop moving within a harvester elevator of a combine, continuously measuring including: measuring a plurality of discrete crop weights in an ascending segment of the harvester elevator for a corresponding plurality of harvested crop quantities, each of the harvested crop quantities is static relative to each of a plurality of paddles including a corresponding plurality of instruments within the harvester elevator, each of the plurality of instruments include a weight sensor, the weight sensor configured to measure one of the discrete crop weights of the harvested crop quantities; communicating the plurality of discrete crop weights to a receiver and processing node; and determining a total harvested crop weight from the plurality of discrete crop weights.

Example 20 can include, or can optionally be combined with the subject matter of one or any combination of Examples 1-19 to optionally include comprising generating a crop weight log with the plurality of measured discrete crop weights.

Example 21 can include, or can optionally be combined with the subject matter of one or any combination of Examples 1-20 to optionally include comprising generating a harvested crop weight map, including associating the plurality of measured discrete crop weights with corresponding locations of a field.

Example 22 can include, or can optionally be combined with the subject matter of one or any combination of Examples 1-21 to optionally include wherein determining the total harvested crop weight includes monitoring a harvester elevator loop speed of the harvester elevator, the harvester elevator loop speed including a rate of rotation of the plurality of paddles.

Example 23 can include, or can optionally be combined with the subject matter of one or any combination of Examples 1-22 to optionally include wherein determining the total harvested crop weight includes multiplying the sum of the plurality of discrete crop weights by the ratio of the number of weight sensors to a total number of paddles in the harvester elevator loop.

Example 24 can include, or can optionally be combined with the subject matter of one or any combination of Examples 1-23 to optionally include wherein continuously measuring includes measuring with at least two weight sensors, and the at least two weight sensors are distributed among the plurality of paddles along the harvester elevator to measure at least one of the plurality of discrete crop weights of the harvested crop quantities ascending along the ascending segment at any given time.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or The claimed invention is:

1. A system for measuring crop weight in a harvester elevator having a plurality of paddles for moving crop in an ascending segment comprising:
   a receiver and processing node;
   one or more weight sensing instruments, each of the one or more weight sensing instruments including:
      a weight sensor configured for coupling with a portion of a paddle of the plurality of paddles, and
      a transmitter in communication with the receiver and processing node; and
   wherein each weight sensing instrument is coupled with a respective one of the paddles of the plurality of paddles of the harvester elevator so that each weight sensing instrument moves with the respective paddle to measure a crop weight of a harvested crop as the harvested crop moves along the ascending segment of the harvester elevator, and is configured to measure the weight of the harvested crop positioned on the respective paddle.

2. The system of claim 1 comprising a harvester elevator including an elevator loop having the plurality of paddles, and the plurality of paddles are configured to move about the elevator loop in an elevator loop cycle.

3. The system of claim 2, wherein the one or more weight sensing instruments are distributed among the plurality of paddles of the elevator loop to have at least one weight sensor in the ascending segment at any given time.

4. The system of claim 2 comprising at least two weight sensing instruments coupled with at least two respective paddles of the plurality of paddles, and the at least two respective paddles are distributed on the elevator loop to continually measure the crop weight of the harvested crop ascending along the ascending segment.

5. The system of claim 2, wherein the receiver and processing node is configured to determine a rate of the elevator loop cycle.

6. The system of claim 5, wherein the one or more instruments are configured to determine a total weight of the harvested crop moved through the harvester elevator.

7. The system of claim 1, wherein the one or more weight sensors are configured to measure the crop weight content of the harvested crop when the quantity of the harvested crop is static relative to the corresponding weight sensor and ascending within the harvester elevator.

8. The system of claim 1, wherein each of the one or more instruments includes a microprocessor configured to perform at least one of filtering and averaging a plurality of weight measurements of the corresponding weight sensor.

9. The system of claim 1, wherein each of the one or more instruments further comprises:
   a deactivation trigger configured to power down the weight sensor while the corresponding paddle is moving along a descending segment of the harvester elevator; and
   an activation trigger configured to power on the weight sensor while the corresponding paddle is moving along the ascending segment of the harvester elevator.

10. The system of claim 9, wherein the measurement trigger includes at least one of a position sensor, a static weight sensor, a threshold sensor, and an ascendance sensor.

11. The system of claim 9, wherein the measurement trigger includes near field transmitter and receiver.

12. The system of claim 1, wherein the weight sensor is positioned below the paddle as the harvested crop ascends along the ascending segment of the harvester elevator.

13. A method for measuring a crop weight comprising:
   engaging a plurality of paddles with a harvested crop in a trough segment of a harvester elevator;
   moving the harvested crop through an ascending segment of the harvester elevator with the plurality of paddles; and
   measuring a crop weight of the moving harvested crop in the ascending segment of the harvester elevator with one or more weight sensing instruments, each installed on a portion of one of the paddles, respectively.

14. The method of claim 13, wherein measuring the crop weight includes continuously measuring the crop weight of the harvested crop with at least one of the one or more instruments coupled to one of the one or more paddles lifting the harvested crop through the ascending segment.

15. The method of claim 14, wherein the one or more paddles are distributed between the plurality of paddles of the harvester elevator in a configuration that positions at least one of the one or more paddles and one of the one or more weight sensing instruments within the ascending segment throughout operation of the harvester elevator, and
   wherein measuring the crop weight includes continuously measuring the crop weight of the harvested crop in the ascending segment.

16. The method of claim 13, wherein measuring the crop weight includes measuring the crop weight of a quantity of the harvested crop while the harvested crop is static relative to the weight sensing instrument and ascending within the harvester elevator.

17. The method of claim 13 comprising powering down one or more weight sensing instruments when the one or more weight sensing instruments are moving along a descending segment of the harvester elevator.

18. The method of claim 13 comprising triggering the one or more weight sensing instruments to measure the crop weight content of the harvested crop in the ascending segment.

19. The method of claim 13 comprising corresponding at least a portion of the weight measurements to a location on a field.

20. The method of claim 13, wherein each of the one or more weight sensing instruments comprises a weight sensor that is positioned below the respective paddle to which the weight sensing instrument is coupled when the paddle ascends along the ascending segment.

21. A method for measuring in-flow weight of a harvested crop comprising:

continuously measuring a weight of a harvested crop moving within a harvester elevator of a combine, continuously measuring including:
  measuring a plurality of discrete crop weights in an ascending segment of the harvester elevator for a corresponding plurality of harvested crop quantities, each of the harvested crop quantities is static relative to a respective paddle associated with the harvest crop quantity, the respective paddle including a corresponding plurality of instruments, each of the plurality of instruments include a weight sensor, the weight sensor configured to measure one of the discrete crop weights of the harvested crop quantities positioned on or within a portion of the respective paddle with which the weight sensor is associated;
  communicating the plurality of discrete crop weights to a receiver and processing node; and
  determining a total harvested crop weight from the plurality of discrete crop weights.

22. The method of claim 21 comprising generating a crop weight log with the plurality of measured discrete crop weights.

23. The method of claim 21 comprising generating a harvested crop weight map, including associating the plurality of measured discrete crop weights with corresponding locations of a field.

24. The method of claim 23, wherein determining the total harvested crop weight includes monitoring a harvester elevator loop speed of the harvester elevator, the harvester elevator loop speed including a rate of rotation of the plurality of paddles.

25. The method of claim 24, wherein determining the total harvested crop weight includes multiplying the sum of the plurality of discrete crop weights by a ratio of a total number of paddles in the harvester elevator loop to the number of weight sensors.

26. The method of claim 21, wherein continuously measuring includes measuring with at least two weight sensors, and the at least two weight sensors are distributed among the plurality of paddles along the harvester elevator to measure at least one of the plurality of discrete crop weights of the harvested crop quantities ascending along the ascending segment at any given time.

27. The system of claim 21, wherein the weight sensor is positioned below its respective paddle as the paddle ascends along the ascending segment.

* * * * *